United States Patent Office 3,261,804
Patented July 19, 1966

3,261,804
COMPOSITIONS COMPRISING UNIRRADIATED AND IRRADIATED MIXTURES OF A POLYOLEFIN AND A THIOPHOSPHATE ESTER AND THE METHOD OF IRRADIATING THE COMPOSITION
Bruce Graham, Los Altos, Calif., assignor to W. R. Grace & Co., Cambridge, Mass., a corporation of Connecticut
Filed Jan. 30, 1959, Ser. No. 790,236
Claims priority, application Canada, Aug. 31, 1956, 713,881
16 Claims. (Cl. 260—45.7)

This application is a continuation-in-part of application Serial No. 661,275 filed May 24, 1957, now abandoned.

The present invention relates to novel polyethylene and polypropylene compositions and methods for preparing the same.

It is well known that upon exposure to air at elevated temperatures for long periods of time that polyethylene and polypropylene undergo oxidative decomposition. The problem is particularly acute with irradiated polyethylene and polypropylene.

It is an object of the present invention to provide novel polyethylene and polypropylene compositions having improved heat stability.

A more specific object is to provide novel irradiated polyethylene and polypropylene compositions having improved heat stability.

An additional object is to improve the heat stability of polyethylene when in contact with metals such as copper or aluminum.

Other objects and advantages of this invention, it is believed, will be readily apparent from the following detailed description of preferred embodiments thereof.

It has now been found that these objects can be attained by mixing a solid polymer of an olefin having two or three carbon atoms, i.e. polyethylene or polypropylene or copolymers of ethylene and propylene, with a sulfur containing organic phosphorus compound having one of the formulae

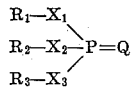

and

where $R_1$, $R_2$ and $R_3$ are hydrocarbon groups, $X_1$, $X_2$, $X_3$ are oxygen or sulfur, Q is oxygen or sulfur and at least one of $X_1$, $X_2$, $X_3$ and Q is sulfur.

The polyethylene can be conventional high pressure (branched chain) polyethylene or low pressure (linear) polyethylene such as that prepared by the Ziegler or Phillips process. The polyethylene can be of high or low density.

The invention will best be understood with reference to the drawings wherein.

Figure 1:
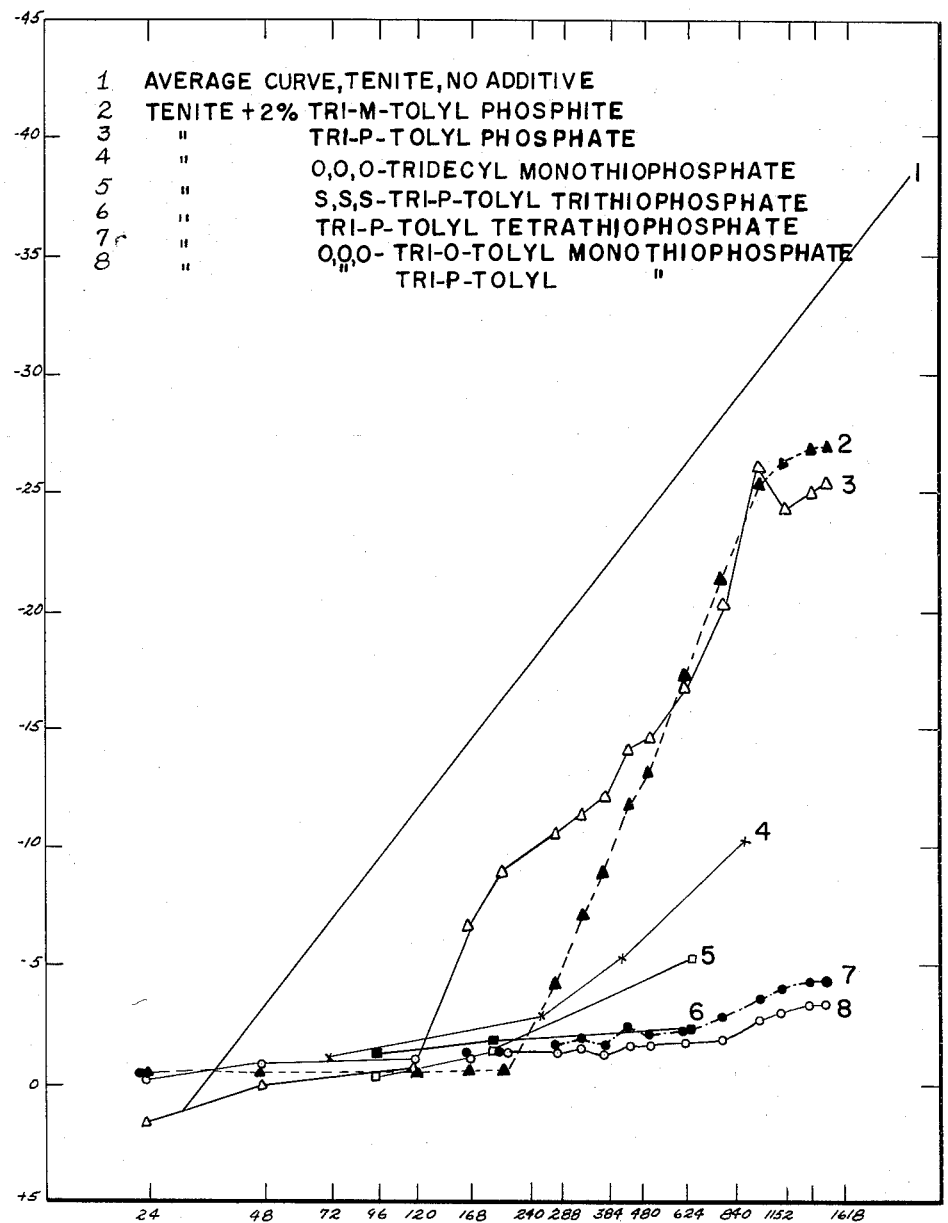
FIGURE 1 is a graph comparing the heat stability of irradiated polyethylene admixed with sulfur containing phosphorus compounds of the present invention with heat stability of the same irradiated polyethylene alone or admixed with other phosphorus compounds not coming within the invention.

The sulfur containing organic phosphorus compound can be admixed with the polyolefin in any of a number of conventional ways. Preferably the polyolefin is melted and the sulfur containing organic phosphorus compound thoroughly blended therein.

Useful articles can then be formed from this mixture utilizing conventional fabrication techniques such as molding, e.g. injection molding, extruding and the like. Thus there can be prepared bags and other containers, electrical insulation, etc.

In the preferred form of the invention the polyolefin, e.g. polyethylene, is irradiated after incorporating the sulfur containing phosphorus compound since particularly effective and unexpected improvement in the heat stability of the polyolefin is obtained. While non-irradiated polyethylene generally has superior heat stability to irradiated polyethylene it has been found that when one of the additives of the present invention is incorporated in the polyethylene not only is the heat stability of both the irradiated and unirradiated polyethylene improved but that the heat stability of the irradiated polyethylene becomes superior to that of the non-irradiated polyethylene.

The irradiation of the polyethylene or polypropylene can be accomplished with any of a wide variety of high energy sources such as radioactive materials, gamma ray sources, linear accelerators, e.g. Van de Graaff accelerators such as those described in Van de Graaff Patent 1,991,236, resonance transformer type cathode ray machines, e.g. as shown in Westendorp Patent 2,144,578 or Lawton Patent 2,858,259 or any other type linear electron beam accelerators, atomic piles, X-ray machines, betatrons, neutron sources, radioactive elements, e.g. cobalt 60, etc. Other suitable sources of irradiation are set forth in Rainer Patent 2,855,517. The radiation dose can be varied between $1 \times 10^5$ REP and $1 \times 10^9$ REP with the range between $1 \times 10^6$ and $1 \times 10^8$ REP being generally the most useful. The primary radiation, is carried out using a mechanism capable of producing a radiation unit having an energy in excess of 20,000 volts. Desirably there is employed a high voltage accelerating apparatus in which there is imparted to electrons an energy of from 50,000 to 20,000,000 electron volts. When it is necessary to penetrate thick materials the irradiation is usually carried out at a voltage of at least about 750,000 electron volts.

While the irradiation dosage is set forth above in terms of REPS it can also be defined in terms of RADS. A RAD is 1.075 times a REP.

Improved room temperature elongation of the additive containing linear polyolefins can be obtained by heat treating the irradiated articles at temperatures of from about 130° C. to about 200° C., preferably in a non-oxidative atmosphere, e.g. nitrogen, for ½ to 5 or more hours.

The sulfur containing phosphorus compounds are used in minor proportions e.g. in concentrations of as low as 0.001% or 0.05% to a high as 10% by weight of the total of the polyolefin and phosphorus compound. Best results are obtained in the range of from about 0.5 to about 5% by weight.

The sulfur containing phosphorus compounds which are used as additives in the present invention can be prepared as described in Kosolapoff "Organophosphorus Compounds" (1950), pages 180–187, 225–226, 228–232 and 234, 37.

Among the compounds which can be employed are triethyl monothiophosphite;
triethyl dithiophosphite;
triethyl trithiophosphite;
tripropyl monothiophosphite;
tripropyl dithiophosphite;
tripropyl trithiophosphite;
tributyl trithiophosphite;
tridodecyl trithiophosphite;
tridodecyl monothiophosphite;
triphenyl trithiophosphite;
tri-p-tolyl trithiophosphite;
tri-p-tolyl dithiophosphite;
tri-p-tolyl monothiophosphite;
tri-o-tolyl trithiophosphite;
tri-p-dodecylphenyl thiophosphite;
O,O,O-trimethyl thiophosphate $(CH_3O)_3P=S$; O,O,S-trimethyl dithiophosphate $(CH_3O)_2(CH_3S)P=S$;
O,O,S-triethyl monothiophosphate $$(C_2H_5O)_2(C_2H_5S)P=O$$

O,S,S-triethyl dithiophosphate $(C_2H_5O)(C_2H_5S)_2P=O$;
S,S,S-triethyl trithiophosphate $(C_2H_5S)_3P=O$;
O,O,O-triethyl monothiophosphate $(C_2H_5O)_3P=S$;
O,O,S-triethyl dithiophosphate $(C_2H_5O)_2(C_2H_5S)P=S$;
O,S,S-triethyl trithiophosphate $(C_2H_5O)(C_2H_5S)_2P=S$;
triethyl tetrathiophosphate $(C_2H_5S)_3P=S$;
O,O,S-tripropyl monothiophosphate;
O,O,O-tripropyl monothiophosphate;
O,O-diethyl S-isobutyl monothiophosphate;
O,O-diisobutyl S-isobutyl monothiophosphate;
O,O,O-triisobutyl monothiophosphate;
O,O,O-triisoamyl monothiophosphate;
triisoamyl tetrathiophosphate;
O,O,O-tridecyl monothiophosphate;
O,O,O-trinonyl monothiophosphate;
O,O,O-tridodecyl monothiophosphate;
tribenzyl tetrathiophosphate;
O,O,O-tribenzyl monothiophosphate;
O,O,O-tricyclohexyl monothiophosphate;
O,O,S-triphenyl monothiophosphate;
S,S,S-triphenyl trithiophosphate;
O,O,O-triphenyl monothiophosphate;
triphenyl tetrathiophosphate;
O,O,O-tri-o-tolylmonothiophosphate;
O,O,O-tri-m-tolyl monothiophosphate;
O,O,O-tri-p-tolyl monothiophosphate;
O,O-diphenyl-O-p-tolyl monothiophosphate;
O-phenyl-O,O-di-p-tolyl monothiophosphate;
O,O-diphenyl-O-p-tertbutylphenyl monothiophosphate;
O,O-diphenyl-O-2-methyl-5 isopropylphenyl monothiophosphate;
O,O,O-tri-2,4-dimethylphenyl monothiophosphate;
O,O,O-tri-2-dodecylphenyl monothiophosphate;
tri-p-tolyl tetrathiophosphate;
S,S,S-tri-p-tolyl trithiophosphate;
O,O,S-tri-p-tolyl monothiophosphate;
O,O,S-tri-p-tolyl dithiophosphate;
O,S,S-tri-p-tolyl dithiophosphate;
O,S,S-tri-p-tolyl trithiophosphate;
O-phenyl, O,O-di-2-phenylphenyl monothiophosphate, and
O-2-phenylphenyl, O,O-di-4-tert-butylphenyl monothiophosphate.

In the generic formulae set forth above in general the thiophosphates are preferred over the corresponding thiophosphites. In similar manner the aromatic thiophosphates are preferred over the aliphatic or alkyl thiophosphates. The most preferred group of compounds is the O,O,O-triaryl monothiophosphates and of this preferred group the best compound is O,O,O-tri-p-tolyl monothiophosphate. In a test of several of the compounds within the invention as heat stabilizers for irradiated polyethylene the series compounds in decreasing order of heat stabilizer activity was found to be

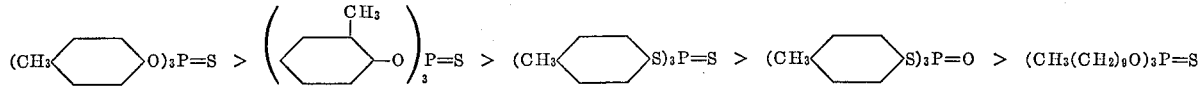

The poorest compound in this series, however, was much superior to both tri-p-tolyl phosphate and tri-m-tolyl phosphite as a heat stabilizer for the irradiated polyethylene.

In the following examples and through the specification and claims unless otherwise stated all proportions and percentages are by weight.

*Example 1*

Ninety-nine parts of Tenite 800 a commercial branched chain polyethylene (melt index of 2.4–1.5; viscosity at 190° C. of $47 \times 10^3$ poises) was melted in a Sigma Mixer at 130° C., and to the melt was added one part by weight of O,O,O-tri-p-tolyl monothiophosphate. The composition thus produced was molded into tensile test strips which were used for measurement of physical properties and for irradiation studies. The remarkably high tensile strengths of these compositions after irradiation of the strips by room temperature exposure to cobalt 60 gamma rays at the rate of 900,000 Roentgens per hour, followed by many hours of heat aging at 150° C., is apparent from the following Table 1.

TABLE 1.—EFFECT OF THE ADDITION OF O,O,O-TRI-P-TOLYL MONOTHIOPHOSPHATE UPON THE PHYSICAL PROPERTIES OF IRRADIATED COMMERCIAL BRANCHED CHAIN POLYETHYLENE

| Amount added | Irradiation (REP×10⁶) | Heat Aging (Hrs. at 150° C.) | Tensile strength (p.s.i.) | No. of Samples |
|---|---|---|---|---|
| 1% | 60 | 0 | 2,500 | 2 |
| None | 60 | 0 | 3,250 | 2 |
| 1% | 60 | 48 | 2,460 | 2 |
| None | 60 | 48 | 955 | 2 |
| 1% | 60 | 132 | 1,900 | 4 |
| None | 60 | 132 | 640 | 3 |
| 1% | 60 | 140 | 2,090 | 2 |
| None | 60 | 140 | 714 | 2 |
| 1% | 60 | 160 | 2,470 | 2 |
| None | 60 | 160 | 735 | 2 |
| 1% | 63 | 130 | 2,210 | 4 |

Varying the atmosphere surrounding the polyolefin and additive formulation during irradiation has an effect upon the tensile strength after heat aging. However, whether air or a vacuum is employed the tensile strength of the composition of Example 1 is still higher than that of the same polyethylene without the O,O,O-tri-p-tolyl monothiophosphate, as is indicated by Table 2 using the same initial polyethylene as that employed in Table 1.

TABLE 2

| Additive | Atmosphere during Irradiation | Irradiation (REP×10⁶) | Heat Aging (Hrs.) | Heat Aging (Temp., °C.) | Tensile Strength, p.s.i. | No. of Samples |
|---|---|---|---|---|---|---|
| None | Air | 63.6 | 168 | 159 | 599 | 1 |
| Do | Vacuum | 60 | 168 | 159 | 299 | 2 |
| 1% tri-p-tolyl monothiophosphate | Air | 63.6 | 168 | 159 | 1,660 | 1 |
| Do | Vacuum | 60 | 168 | 159 | 1,090 | 1 |
| Do | do | 60 | 168 | ¹ 150 | 1,400 | 1 |

¹ Vacuum.

Example 2

Tenite 800 polyethylene a low density polyethylene described in Example 1 was mixed with 1% by weight of O,O,O-tri-p-tolyl monothiophosphate by melting as described in Example 1. The product was irradiated to a dosage of 12 megarep using a 2 m.e.v. resonant transformer of the type referred to in Lawton Patent 2,858,259. The product had considerably improved heat stability when tested at 150° C. as compared to a correspondingly irradiated sample of the polyethylene which did not contain the thiophosphate.

Example 3

A commercial low density polyethylene (0.918 density) was admixed with 2% of O,O,O-tri-p-tolyl monothiophosphate. The mixture was then extruded around a copper wire to form an insulation and the insulated wire subjected to 24 megarad irradiation using a 1 m.e.v. General Electric Resonant Transformer. Upon heat aging the insulation was still good after 24 hours at 190° C. In contrast when the same polyethylene without the thiophosphate was extruded around copper wire and the insulated wire irradiated to 24 megarad the insulation failed in less than 8 hours at 150° C. When aluminum wire was tested in the same manner the polyetheylene containing the thiophosphate likewise had superior heat stability as compared with polyethylene omitting the thiophosphate. The results obtained in this example are important in electrical uses for the polyethylene in view of the wide spread use of insulated copper wiring. Many materials which are heat stabilizers for polyethylene alone are ineffective when the polyethylene is in contact with copper or aluminum.

Example 4

Hibernia polypropylene (specific viscosity of 2.25 measured as a 0.1 gram solution in 100 ml. of Decalin) was dry blended with 2% of O,O,O-tri-p-tolyl monothiophosphate, the mixture extruded on a 1″ extruder and pelletized on a Wiley mill. The pellets were heated on a Carver press for 3 minutes at 400° F., then pressed for 3 minutes at 600 p.s.i. at the same temperature and finally permited to cool in air. The polypropylene was then irradiated with a 2 m.e.v. electron accelerator to a total dosage of 30 megarad. Another sample of the polyproylene without the thiophosphate was likewise irradiated to a dosage of 30 megarad. The two samples of irradiated polyethylene were then heat aged at 150° C. with the following results:

| Time (days) | 2 | 4 | 7 | 14 | 18 |
|---|---|---|---|---|---|
| Irradiated Polypropylene (No additive)—change in weight, percent | −19.0 | −43.3 | −53.2 | −56.4 | −61.7 |
| Irradiated Polypropylene plus thiophosphate—change in weight, percent | −0.94 | −1.33 | −1.52 | −1.65 | −6.3 |

From this example it can be seen that incorporation of the O,O,O-tri-p-tolyl monothiophosphate greatly improved the resistance of the polypropylene to heat aging.

The effectiveness of various additives as stabilizers for for polyethylene is shown graphically in FIGURES 1–4 of the drawings. In the drawings Tenite denotes Tenite 800 a low density polyethylene made by conventional procedures. Grex is a high density polyethylene (density of 0.97) and has a $[\eta/C]_{sp}$ measured at 0.1 gram/100 ml. in Decalin of 2.38. The irradiation dosage in FIGURES 1–3 was 18.6 megarads and cobalt 60 was utilized as the irradiation sources.

Figure 2:
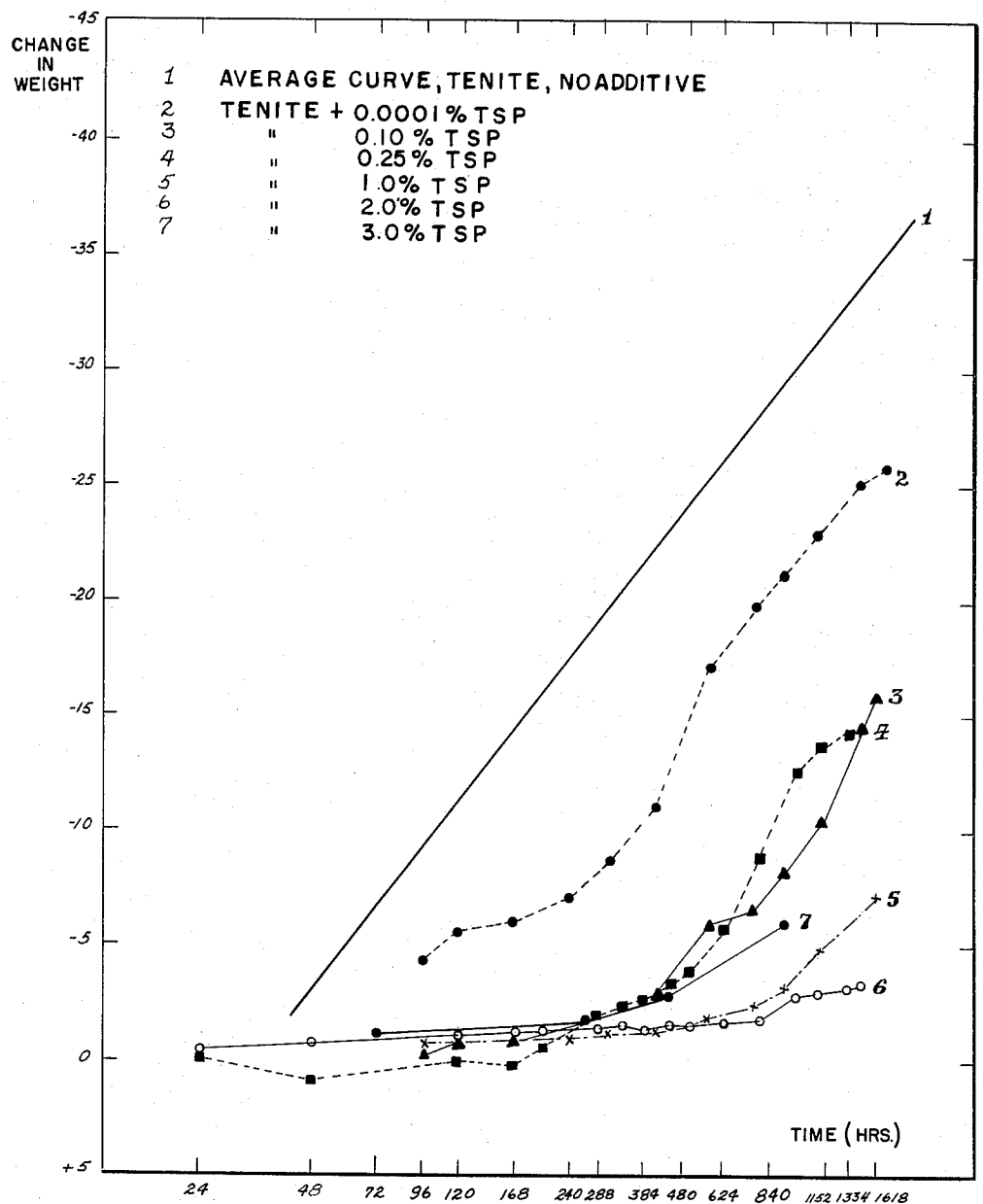
FIGURE 2 is a graph illustrating the effect of varying amounts of tri-p-cresyl monothiophosphate on the heat stability of irradiated polyethylene.
Figure 3:
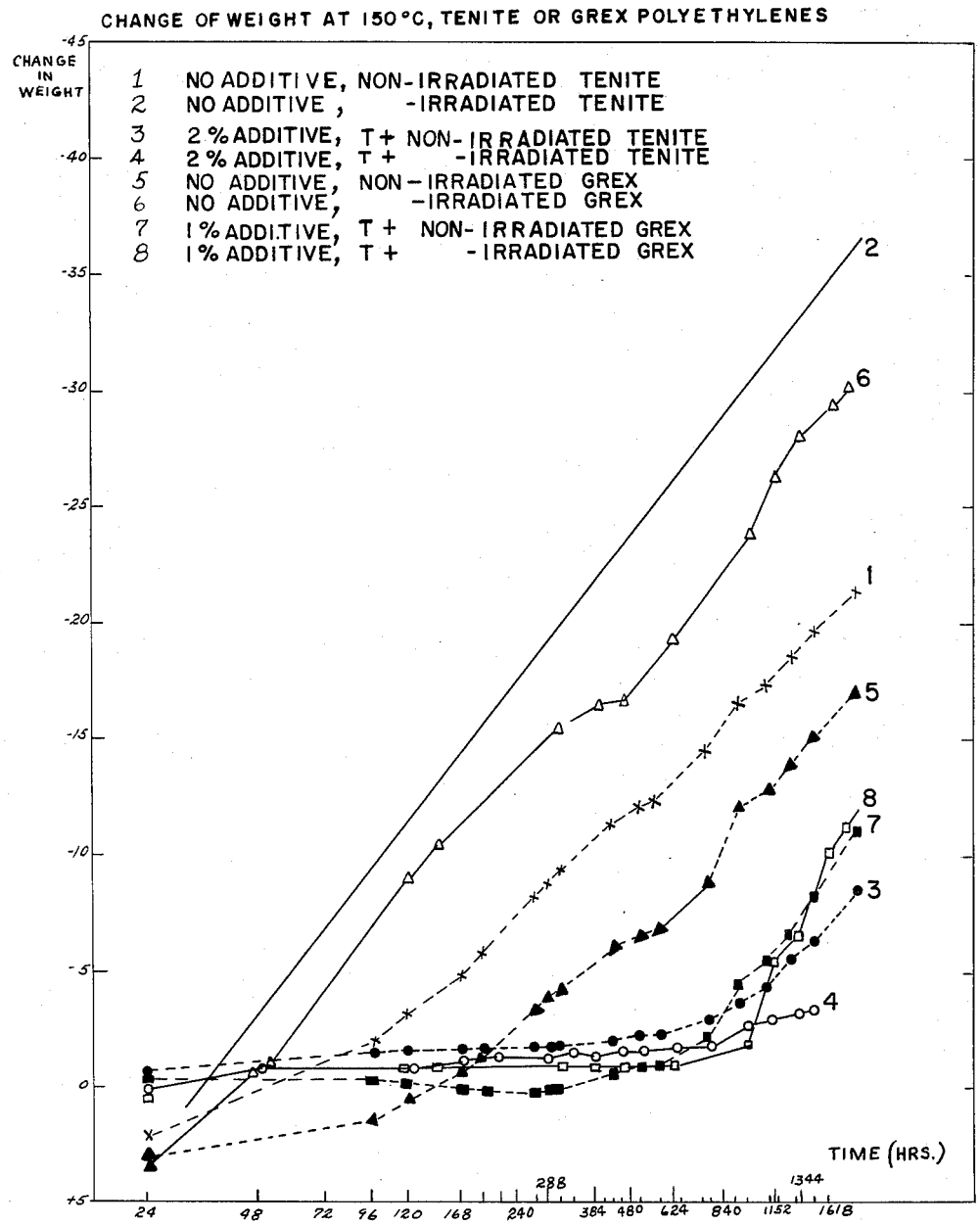
FIGURE 3 is a graph comparing the effect of tri-p-cresyl monothiophosphate on the heat stability of irradiated and non-irradiated high and low density polyethylene.

In FIGURES 1–3 the curve for the unirradiated, unmodified Tenite is the average of several samples.

As can be readily seen from FIGURE 1 tri-m-tolyl phosphite and tri-p-tolyl phosphate are considerably inferior to the sulfur containing organic phosphorus compounds of the present invention as heat stabilizers for irradiated polyethylene, particularly over the longer periods of heating at 150° C. For example after 624 hours of Tenite by itself had an average loss in weight of over 26%; Tenite together with 2% of tri-m-tolyl phosphite had a loss in weight of about 17.5%; Tenite together with 2% of tri-p-tolyl phosphate had a loss in weight of about 17%; Tenite together with 2% of O,O,O-tridecyl monothiophosphate had a loss in weight of about 8%; Tenite together with 2% of S,S,S-tri-p-tolyl trithiophosphate had a loss in weight of about 5%; Tenite together with 2% of tri-p-tolyl tetrathiophosphate had a loss in weight of about 2.5%; Tenite together with 2% of O,O,O-tri-o-tolyl monothiophosphate had a loss in weight of about 2.5%; and Tenite together with 2% of O,O,O-tri-p-tolyl monothiophosphate had a loss in weight of about 2%.

From FIGURE 2 it can be seen that O,O,O-tri-p-tolyl monothiophosphate was most effective as a heat stabilizer for the irradiated polyethylene when employed in an amount of 1 to 2%. The effectiveness of the stabilizer decreased slightly when used in an amount of 3% and also decreased to some extent when utilizing lower amounts e.g. 0.25%.

FIGURE 3 clearly shows that O,O,O-tri-p-tolyl monothiophosphate (TSP) is a good heat stabilizer for both irradiated and unirradiated low density polyethylene (Tenite 800) and for both irradiated and unirradiated high density polyethylene (Grex). FIGURE 3 also shows that the stabilizer is more effective on irradiated polyethylene than on unirradiated polyethylene. From FIGURE 3 it can be seen that unirradiated Tenite 800 without TSP had a weight loss of 20.5% after 1618 hours at 150° C. In contrast the same non-irradiated Tenite containing 2% of TSP had a weight loss of only 7% after 1618 hours at 150° C. Irradiated Tenite 800 under the same conditions had a weight loss of 35% as contrasted to a weight loss of the same irradiated Tenite containing 1% of TSP of only 3.5%. Thus the non-irradiated sample of Tenite containing 2% TSP showed only ⅓ the weight loss, (a measure of heat stability) as contrasted with the same Tenite having no TSP. The irradiated sample of Tenite containing TSP had only 1/10 the weight loss of the corresponding sample of Tenite omitting the TSP.

FIGURE 3 shows similar results were obtained with Grex polyethylene although there is not as great a difference between the blanks and the samples containing 1% of TSP.

Figure 4:
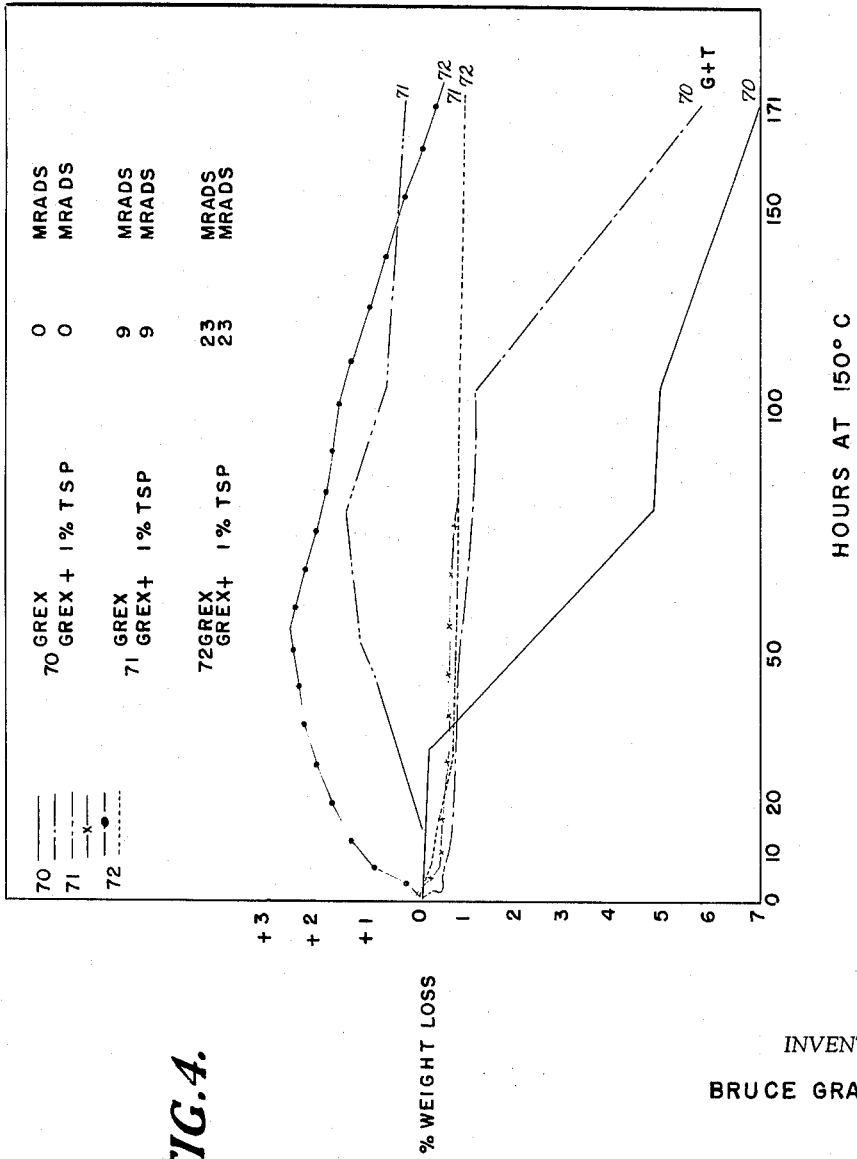
FIGURE 4 is a graph showing the effect on short term heat stability of tri-p-cresyl monothiophosphate on Grex high density polyethylene, both irradiated and non-irradiated.

FIGURE 4 shows the effect of O,O,O-tri-p-tolyl monothiophosphate (TSP) as a heat stabilizer for both irradiated and unirradiated high density polyethylene (Grex) over a short period of time. In FIGURE 4, 1% of the monothiophosphate was employed. It will be observed that without irradiation and without the TSP the Grex sample immediately started to lose weight and, in fact, had lost 1% at the end of 10 hours and had lost 5% after 100 hours at 150° C. The corresponding Grex sample containing the TSP at the end of 10 hours had lost only 0.6%, of which a considerable fraction was due simply to the volatility of the TSP additive. At the end of 100 hours, the weight loss was only approximately 1%.

When the Grex was irradiated to the extent of 9 megarads, the sample without the TSP showed a slight weight loss during the first 20 hours which was probably due to the removal of the more volatile low molecular weight polyethylene fraction and thereafter the weight of the polyethylene increased until at the end of 80 hours of total time at 150° C., the weight was more than 1% larger than the initial weight of the polyethylene. This increase in weight was due to peroxide and/or hydroperoxide formation and indicated a deterioration in the polyethylene. The Grex, after the 80 hours of treatment, started to lose weight gradually, which further showed degradation of the polymer.

In contrast, when 1% of TSP was employed, FIGURE 4 shows results somewhat similar to those obtained with TSP without any irradiation but with considerable improvement toward the higher end of the test. Even after 171 hours, the Grex with the TSP showed a smaller loss in weight than was shown by the Grex plus TSP without any irradiation.

When the Grex was irradiated to an extent of 23 megarads, the results were somewhat similar to those obtained at a 9 megarad irradiation but were accentuated. Thus, the Grex sample without any TSP immediately started to gain weight and reached a maximum gain of about 2.5% after 55 hours and then began to lose weight. As previously explained, this shows a degradation of the polymer. However, when 1% of TSP was added, the results were almost identical with those obtained at an irradiation of 9 megarad.

What is claimed:
1. A composition comprising a mixture of a solid polymer of an olefin having 2 to 3 carbon atoms and a minor amount of a thiophosphate ester, the amount of said ester being sufficient to stabilize said polymer.
2. A composition comprising polyethylene and a O,O,O-triaryl monothiophosphate in an amount of 0.001% to 10% by weight of the total of the polymer and the monothiophosphate.
3. A composition comprising polyethylene and a O,O,O-tritolyl monothiophosphate in an amount of 0.001% to 10% by weight of the total of the polymer and the monothiophosphate.
4. A composition comprising polyethylene and O,O,O-tri-p-tolyl monothiophosphate in an amount of 0.001% to 10% by weight of the total of the polymer and the monothiophosphate.
5. A composition comprising a solid polymer of an olefin having 2 to 3 carbon atoms and a O,O,O-tritolyl monothiophosphate in an amount of 0.001% to 10% by weight of the total of the polymer and the monothiophosphate.
6. A composition comprising polyethylene and a triaryl thiophosphate in an amount of 0.001% to 10% by weight of the total of the polymer and the monothiophosphate.
7. A composition comprising irradiated polyethylene and a triaryl thiophosphate in an amount of 0.001% to 10% by weight of the total of the polyethylene and thiophosphate, said irradiation having been with a dosage of between $1 \times 10^6$ REP and $1 \times 10^8$ REP.
8. A composition comprising irradiated polyethylene and a O,O,O-triaryl monothiophosphate in an amount of 0.001% to 10% by weight of the total of the polyethylene and thiophosphate, said irradiation having been with a dosage of between $1 \times 10^6$ REP and $1 \times 10^8$ REP.
9. A composition according to claim 8 wherein the monothiophosphate is an O,O,O-tritolyl monothiophosphate.
10. A composition according to claim 9 wherein the monothiophosphate is

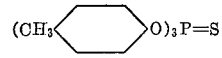

11. A process comprising irradiating polyethylene and a triaryl thiophosphate in an amount of 0.001% to 10% by weight of the total of the polyethylene and the thiophosphate with a dosage of between $1 \times 10^6$ REP and $1 \times 10^8$ REP.
12. A process comprising irradiating polyethylene and a O,O,O-tritolyl monothiophosphate in an amount of 0.001% to 10% by weight of the total of the polyethylene and the thiophosphate with a dosage of between $1 \times 10^6$ REP and $1 \times 10^8$ REP.
13. A process comprising irradiating polyethylene and O,O,O-tri-p-tolyl monothiophosphate in an amount of 0.001% to 10% by weight of the total of the polyethylene and the thiophosphate with a dosage of between $1 \times 10^6$ REP and $1 \times 10^8$ REP.
14. A composition comprising polyethylene and a O,O,O-trihydrocarbon monothiophosphate in an amount of 0.001% to 10% by weight of the total of the polyethylene and the thiophosphate.
15. A composition according to claim 14 wherein the polyethylene is polyethylene that has been irradiated to a dosage of between $1 \times 10^6$ REP and $1 \times 10^8$ REP.
16. A composition comprising a mixture of a member of the group consisting of an unirradiated solid polymer of an olefin having 2 to 3 carbon atoms and an irradiated solid polymer of an olefin having 2 to 3 carbon atoms, the irradiation being to a dosage of between $1 \times 10^5$ REP AND $1 \times 10^9$ REP and a minor amount of a thiophosphate ester said ester being used in an amount effective to stabilize said member.

References Cited by the Examiner

UNITED STATES PATENTS

| | | | |
|---|---|---|---|
| 2,242,260 | 5/1941 | Prutton | 260—461.111 |
| 2,355,106 | 8/1944 | Prutton | 260—461.111 |
| 2,794,011 | 5/1957 | Beber | 260—45.7 |
| 2,824,847 | 2/1958 | Fath | 260—461.112 |
| 2,860,115 | 11/1958 | Hecker et al. | 260—30.6 |
| 2,863,812 | 12/1958 | Graham | 204—154 |
| 2,863,850 | 12/1958 | Ragsdale | 260—45.7 |
| 2,878,174 | 3/1959 | Rainer et al. | 204—154 |
| 2,989,451 | 6/1961 | Prochaska | 204—154 |

FOREIGN PATENTS 546,816   10/1956   Belgium.

SAMUEL H. BLECH, *Primary Examiner.*

JOHN R. SPECK, MURRAY TILLMAN, *Examiners.*

R. H. ROBINSON, N. F. OBLON,
*Assistant Examiners.*